May 14, 1968   R. T. LEWICKI   3,382,727
SERVOMECHANISM
Filed Dec. 13, 1965
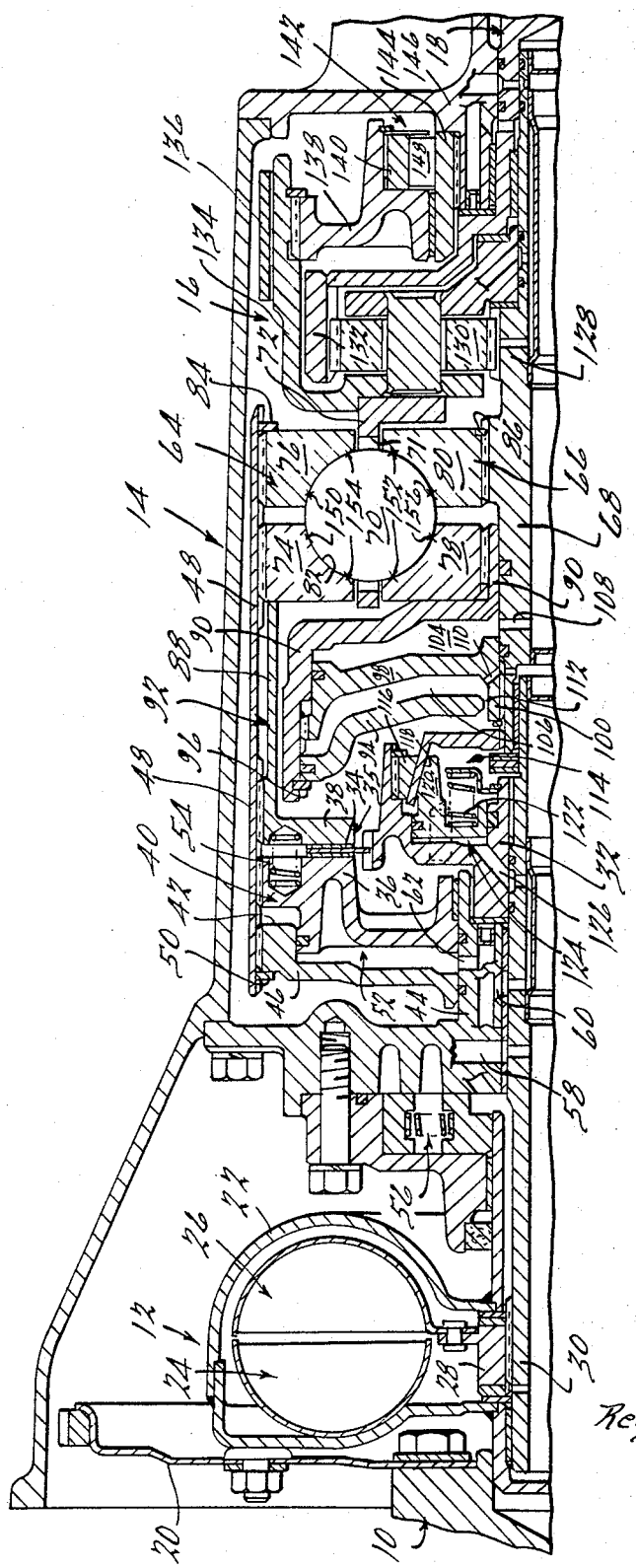
INVENTOR.
Reginald T. Lewicki.
BY John R. Faulkner,
Robert E. McCollum
ATTORNEYS

# United States Patent Office 3,382,727
Patented May 14, 1968

3,382,727
SERVOMECHANISM
Reginald T. Lewicki, Dearborn Heights, Mich., assignor to Ford Motor Company, Dearborn, Mich., a corporation of Delaware
Filed Dec. 13, 1965, Ser. No. 513,515
4 Claims. (Cl. 74—190)

ABSTRACT OF THE DISCLOSURE

A fluid pressure actuated piston assembly is non-rotatably connected to the input drive race of a ball friction drive mechanism, the races having axially slidable elements, the piston having axially spaced and slidable portions that are in interdigited relationship with a power input friction drive element so that axial movement of the piston to axially move the race elements clutches the power input element to the piston and thereby provides the power for driving the ball drive.

---

This invention relates, in general, to the construction of a piston assembly for use in a servomechanism. More particularly, it relates to the construction of a rotating piston that both clamps the elements of a friction drive device together and drives the device.

Ball drive units that are used in motor vehicle transmissions generally consist of inner and outer annular races that are separated by ball members movable radially to adjust the ball drive ratio. The races are usually of the split type, having portions that are moved by servomechanisms to vary the positions of the balls. Varying the fluid pressure to the servos changes the ball drive ratio, or, if the pressure is reduced, provides a non-drive condition of operation. An additional drive clutch generally is provided between the power input member and the ball drive input element to provide a break in the power train when desired.

The above type of construction having a drive clutch usually requires at least two separate fluid pressure actuated piston members and two separate backing or reaction members, one set for engaging the drive clutch, and another set for clamping the ball drive elements together. The invention relates to a single piston construction that provides both functions.

The piston assembly of the invention not only clamps the friction drive elements together, but simultaneously clutches a power input member to the driving portion of the ball drive unit. In general, the piston assembly consists of a movable piston having spaced interconnected axially slidable portions that are non-rotatably connected to the input elements of the friction drive unit. The slidable piston portions constitute the driven members of a friction disc type clutch, the driving member being secured to a power input member. When the piston is moved in a direction to clamp the ball drive unit elements together to provide a drive, the power input friction disc is simultaneously clamped to the piston whereby torque is then transmitted through the piston to the driving race portions.

It is one object of the invention, therefore, to provide a dual function piston assembly consisting of a multi-part piston in nesting arrangement with a torque input member whereby movement of the piston to act on another member automatically connects the driving member to the member being actuated.

A still further object of the invention is to provide a ball drive type motor vehicle transmission in which a fluid pressure actuated piston for clamping the ball drive elements together has clutch portions engageable with a power input member upon movement of the piston in a ball race clamping direction.

Other objects, features and advantages of the invention will become apparent upon reference to the succeeding, detailed description thereof, and to the drawing illustrating a cross-sectional view of one-half of a motor vehicle transmission embodying the invention.

The transmission shown in the figure, which is essentially to scale, is of the type that could be used in a motor vehicle to provide an infinite number of speed ratio changes between a conventional internal combustion engine and a power output shaft leading to the rear axle final reduction drive unit. In general, the transmission includes an engine-driven power input shaft 10 that drives a fluid coupling unit 12, the output of which transmits the engine torque to the input of an adjustable ball drive friction unit 14. The output from the ball drive unit is transmitted through a planetary gearset 16 to a power output shaft 18.

More specifically, input shaft 10 is drivingly connected through a conventional flywheel 20 to the rotatable shell 22 of a hydrodynamic type torque transmitting device 12. This device is of a known type, having a bladed pump or impeller member 24 secured to shell 22 and facing a bladed turbine member 26 secured at its hub 28 to a shaft 30.

Fluid coupling unit 12 is shown as being of the constantly filled type, that is, filled with operating fluid at all times to transmit continuously the torque of input shaft 10 to shaft 30 in a smooth manner. It will be clear, however, that it could be of the selectively operable fill and empty type, if desired; and, if of such a type, would have a valve suitably controlling the fluid discharge from the coupling, in a known manner, to break or connect the drive between shafts 10 and 30, at the will of the operator.

Shaft 30 is rotatably piloted within a portion of driveshaft 10, and extends rearwardly for a fixed connection with a flanged portion 32. The radially outer portion of flange 32 is splined to a friction disc 34 that not only constitutes one part of a forward drive clutch 35, but also the power input member to the ball drive device 14. Disc 34 projects in an interdigited manner between the friction surfaces of a pair of axially aligned, spring separated piston portions 36 and 38.

Piston 40 is axially slidably contained in a recess 42 defined by an extension 44 of the stationary transmission housing, an annular flange 46, and a drum-like member 48 splined to flange 46. Flange 46 is located axially in one direction by a snap ring 50. Suitable seals are provided, as shown, between piston 40 and the recess wall members 44, 46 and 48 to form a fluid pressure chamber 52.

Fluid admitted to chamber 52 moves the two piston portions 36 and 38 together against the force of spring 54 to engage or clamp disc 34 to the piston and thereby rotate piston 40 and drum 48 at the speed of flange 32. The supply of fluid for moving piston 40 is provided by a slipper type fluid pump 56 driven at engine speed by a shaft extension of fluid coupling shell 22. The pump discharges fluid through connecting passages 58, 60 and 62 into chamber 52.

The two piston portions 36 and 38 are splined to drum 48 so that the drum will be rotated when friction disc 34 is clutched to piston 40. The right-hand portion of drum 48 is internally splined to the outer race 64 of friction drive device 14. This device also includes an inner race 66 splined to an intermediate shaft 68. The races are frictionally engaged and spaced by a plurality of circumferentially spaced drive transmitting balls 70 rotatably mounted in pockets 71 of an annular carrier 72. Both of the races 64 and 66 are constructed in a similar manner, having axially spaced annular portions 74, 76, 78 and 80. The race portions have concave complementary surfaces together defining an annular raceway 82 within which balls 70 roll. The balls have essentially a point contact engagement with each of the race portions to provide a frictional drive from drum 48 to shaft 68 in a known manner.

The two race portions 76 and 80 are confined axially in one direction by snap rings 84 and 86 as shown. The two race portions 74 and 78 are mounted for axial sliding movements, these races being moved at the same time and in opposite axial directions with respect to each other and axially with respect to race portions 76 and 80, respectively, to displace the balls 70 vertically from the one-to-one drive ratio position shown, to vary the ball drive ratio. As shown, outer race portion 74 is abutted axially by an extension 88 of piston clutch portion 38. Inner race portion 78, on the other hand, is slidably splined to the housing 90 of an axially movable servomechanism 92.

Servomechanism 92 is essentially closed at its left side by an annular flange 94 located axially on housing 90 by a snap ring 96. Housing 90 is slidably splined to a fluid pressure reaction member 98 that is splined at its hub 100 to intermediate shaft 68. Housing 90 is located axially against a snap ring 102 and a shoulder on shaft 68.

Reaction member 98 and flange 94 are sealingly engaged with housing 90 to provide two separate fluid pressure chambers 104 and 106. Admission of fluid under pressure from pump 56 through a shaft passage 108 into chamber 104 will move housing 90 and inner race portion 78 to the right to raise ball 70 and thereby change the ball drive ratio. Simultaneously, fluid under pressure is admitted into chamber 106 through a passage 110.

The purpose of filling both chambers 104 and 106 with fluid is to balance out the horizontal components of the fluid centrifugal head that if acting in chamber 104 alone would urge the race portion 78 to the right with a greater force as the speed increased. For this reason, the flange 94, the reaction member 98, and the housing 90 are shaped so that the centrifugal force acting on the fluid will provide oppositely acting components that cancel each other and therefore permit a greater pressure in chamber 104 to move the race portion 78 in the desired manner. When the parts stop rotating, fluid in the upper half of chamber 106 will drain through a bleed passage 112 formed between flange 94 and hub 100 of reaction member 98.

Inner race 66 can be connected directly to the power input flange 32 by means of a selectively engageable cone type clutch 114. This clutch includes a driving portion 116 splined to an axial extension of driving member 32, a conical friction member 118 splined to an extension of intermediate shaft 68, and a clutch engaging piston 120 slidably nested within a recess provided in driving flange 32. Clutch 114 is normally biased to a disengaged position by a spring 122, and is moved to an engaged position upon admission of fluid under pressure to a chamber 124 between the piston and flange 32 from passages 126 leading from pump 56.

While not shown, the transmission would be provided with a suitable known type of fluid pressure control system between pump 58, the two piston apply chambers 52 and 124, and the clamping pressure chambers 104 and 106. The control system would include valving to vary the pressure of the fluid supplied to the clamping pistons 40 and 90 in inverse proportion to each other so that, for example, an increase in pressure behind piston 40 to move outer race portion 74 to the right and ball 70 downwardly will be permitted by a simultaneous decrease in fluid pressure in chamber 104 permitting inner race portion 78 to slide leftwardly. A control system of this type is shown and described in S.N. 334,431, George E. Lemieux, "Control System for an Infinitely Variable Speed Friction Drive," assigned to the assignee of this invention.

Intermediate shaft 68 is formed at its right end with a sun gear 128 for the planetary gearset 16. This gearset is of the simple three-element type, and includes a plurality of spaced planet pinion gears 130 meshing with sun gear 128 and a ring gear 132 fixedly connected to power output shaft 18. Planet pinion gears 130 are rotatably journaled on the planet carrier 72 for balls 70. The carrier 72 has an annular drum-like extension 134, the outer peripheral surface of which is adapted to cooperate at times with a fluid pressure actuated brake band 136. Band 136 may be of a known fluid pressure engaged, spring disengaged type.

The drum portion 134 is internally splined to an annular member 138 that contains the outer annular race 140 of a one-way brake 142. This device is of a known overrunning type, and has an inner annular race 144 splined to a portion of the transmission housing 146 and separated from outer race 140 by a plurality of sprags or rollers 148.

The one-way brake operates in a known manner. Counterclockwise rotation of carrier extension 134, into the plane of the paper, pivots the sprags 148 to wedge the two races 140 and 144 together, thereby preventing rotation of member 134. Clockwise rotation of drum 134 out of the plane of the paper rotates the sprags or rollers 148 to positions unlocking or unwedging the two races 140 and 144; thereby permitting free rotation of member 134 in this direction.

The operation of the transmission is as follows: Chambers 104 and 106 would initially be filled with fluid, or the lower half thereof, so that upon rotation, the horizontal components of the centrifugal head acting on the fluid and against the housing 90 portions in these chambers would be cancelled out. Assume now we wish to start with a maximum underdrive ratio. The fluid pressure control system would be activated to supply fluid at a greater pressure to clamping pressure chamber 104 than to servo piston chamber 52. This causes housing 90 to move race portion 78 to the right as far as possible to squeeze ball 70 upwardly, this being permitted by movement of outer race portion 74 to the left. The low pressure in chamber 52, while it permits leftward movement of race portion 74, is sufficient to clamp the driving disc 34 substantially non-rotatably between piston portions 36 and 38, and cause a drive through the ball drive unit. The ball drive race portions at this time, therefore, would contact balls 70 at the points 150 and 152.

Assume now that engine shaft 10 rotates in a clockwise direction out of the plane of the paper to drive the fluid coupling impeller 24 in the same direction and thereby transmit torque to turbine member 26, shaft 30 and to driving disc 34. With clutch 35 engaged, piston 40 now rotates drum 48 and outer race 64. This forward or clockwise rotation of the outer race attempts to drive the inner race 66, shaft 68 and sun gear 128 in a reverse direction. With output shaft 18 stationary and temporarily acting as a reaction member, rearward rotation of sun gear 128 would attempt to rotate carrier 72 in a reverse direction, which is prevented by the automatic engagement of one-way brake 142. Thus, carrier 72 acts as the primary reaction member for both the ball drive unit 14 and the planetary gearset 16. The reverse rotation of sun gear 128 therefore causes a clockwise rotation of planet pinions 130 to drive ring gear 132 and output shaft 18 in a forward or clockwise direction, and at a maximum reduced speed at this time.

As the speed of output shaft 18 increases progressively, a signal would be sent to the automatic transmission control system to gradually increase the pressure in chamber 52 and decrease the pressure in chamber 104. This causes a progressive movement of ball race portion 74 towards race portion 76, a downward movement of balls 70, and movement of race portion 78 away from race portion 80. This will move the points of contact of the balls with both race portions downwardly through the one-to-one position shown towards the maximum overdrive positions indicated at points 154 and 156. Also, brake band 136 would be applied to maintain the gearset in reduction. This is desirable because as the load on ring gear 132 decreases, the carrier 72 would begin to be carried forwardly.

Power output shaft 18 will therefore be brought up progressively to the speed of driving shaft 30 by the combination of the overdrive through ball drive unit 14 and the reduction drive through planetary gearset 16. When shaft 18 is rotating at substantially the same speed as input flange driving member 32, the brake band 136 would be released to permit a forward rotation of carrier 72. The shaft 68 would then slowly change from rotating reversely to a forward rotation. When the drive unit 14 and gearset 16 rotate forwardly at essentially the same speed, cone clutch 114 will then be engaged. This positively drives the ball drive unit and planetary gearset as a unit to provide a positive connection between the power input shaft 30 and output shaft 18, and eliminate losses through the ball drive and planetary units.

If, during low speed operation and before brake 136 is applied, the vehicle should attain a coast condition, that is, output shaft 18 becomes the drive member to the transmission, the planet carrier 72 would tend to rotate in a forward direction off one-way brake 142. This would, in effect, disconnect the output shaft from the engine, which is undesirable. To prevent this, brake 136 can be engaged to hold carrier 72 stationary. Alternatively, one-way brake 142 can be omitted entirely, and the operation controlled by band 136.

A reverse drive is established by decreasing the fluid pressure in chambers 52 and 104, while engaging cone clutch 114. This releases clutch 35 and bypasses the drive around ball friction drive unit 14, and directly connects input shaft 30 to sun gear 128 of planetary gearset 16. Simultaneously, brake 136 would be engaged to hold carrier 72 stationary. Clockwise rotation of sun gear 128 would therefore rotate planet pinions 130 in a reverse direction to rotate ring gear 132 and output shaft 18 in a reverse direction.

From the foregoing, it will be seen that the invention provides a piston assembly that does the work of two; namely, it is movable by fluid under pressure to clamp the outer race portions 74 and 76 of the ball friction drive unit 14 together to provide adjustment of the ball drive ratio or to merely provide a drive through the unit; and, secondly, this movement of the piston clamps the driving disc 34 between the piston portions 36 and 38 to transmit the torque of the engine to the piston and outer drive race 64.

It will be clear, of course, that while the unit has been illustrated for use as a clutching mechanism, it could be installed equally as well for use as a brake, and that the piston need not be actuated by fluid under pressure, but could be actuated mechanically since its operation is not conditioned upon this requirement.

While the invention has been illustrated in its preferred embodiment in the figure, it will be clear to those skilled in the arts to which the invention pertains that many changes and modifications may be made thereto with departing from the scope of the invention.

I claim:
1. A fluid pressure actuated mechanism comprising, a friction drive device having spaced annular driving and driven friction elements frictionally engaging a torque transmitting friction element therebetween, a portion of said elements being movable relative to the others to vary the drive ratio therebetween, and means for clamping said elements together for the transmission of a drive therebetween, said means including movable piston means non-rotatably connected to said driving elements, said piston means having spaced interconnected friction portions, a rotatable friction power input driving member in interdigited relationship with said piston portions and normally spaced therefrom, and means to move said piston, movement of said piston to clamp said elements together clamping said friction driving member to said piston portions to transmit the rotation of said latter driving member to said friction driving elements.

2. A fluid pressure actuated mechanism as in claim 1, said device comprising a ball drive mechanism having spaced drive and driven races frictionally engaged by ball torque transmitting members therebetween.

3. A fluid pressure actuated mechanism as in claim 1, said driving member including a friction clutch disc axially slidably mounted on said power input driving member, said piston including spring means biasing said portions apart for disengagement from said disc.

4. A fluid pressure actuated mechanism as in claim 2, said driving member comprising a rotatable power input member having a first friction part extending between said piston portions, and a second friction part selectively engageable at times with the driven race of said ball drive to establish a unitary drive of said member and piston and drive device.

References Cited

UNITED STATES PATENTS

| | | | |
|---|---|---|---|
| 2,958,234 | 11/1960 | Oehrii | 74—796 X |
| 3,248,960 | 5/1966 | Schottler | 74—190 X |
| 3,280,646 | 10/1966 | Lemieux | 74—796 X |
| 3,293,945 | 12/1966 | Stockton | 74—796 X |
| 3,299,743 | 1/1967 | Stockton | 74—796 X |

FRED C. MATTERN, JR., *Primary Examiner.*

CORNELIUS J. HUSAR, *Examiner.*